United States Patent
Damle et al.

(10) Patent No.: US 9,392,320 B1
(45) Date of Patent: Jul. 12, 2016

(54) ADAPTIVE BATTERY LIFE ENHANCER

(71) Applicant: Amazon Technologies, Inc., Reno, NV (US)

(72) Inventors: Makarand Damle, Sunnyvale, CA (US); Menashe Haskin, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 14/262,543

(22) Filed: Apr. 25, 2014

(51) Int. Cl.
*G08B 1/08* (2006.01)
*H04N 21/422* (2011.01)

(52) U.S. Cl.
CPC ... *H04N 21/42206* (2013.01); *H04N 21/42221* (2013.01)

(58) Field of Classification Search
None
See application file for complete search history.

(56) References Cited

U.S. PATENT DOCUMENTS

| | | | |
|---|---|---|---|
| 8,421,931 B2* | 4/2013 | Park | G08C 17/00 348/734 |
| 2008/0163301 A1* | 7/2008 | Park | G08C 17/00 725/46 |

* cited by examiner

*Primary Examiner* — Travis Hunnings
(74) *Attorney, Agent, or Firm* — Weaver Austin Villeneuve & Sampson LLP

(57) ABSTRACT

A peripheral device includes a user interface and a battery. The peripheral device: accepts inputs from a user via the user interface; responsive to the inputs, and communicates with a base device by way of a wireless communication link. During intervals between the inputs, responsive to one or both of a usage characteristic of the user and an operational mode of the base device, the peripheral device adaptively manages power draw from the battery by switching between a normal mode and a power saving mode.

19 Claims, 8 Drawing Sheets

ADAPTIVE BATTERY LIFE ENHANCER

BACKGROUND

A wireless communication environment may include a wide range of electronic devices such as smart phones, laptop computers, tablets, digital media players, audio/visual equipment such as televisions and stereos, set-top boxes, and game consoles. The electronic devices may be communicatively coupled with each other and/or with a wide area network access point by way of a wireless local area network, a personal area network, or a piconet. One or more of the electronic devices may be communicatively coupled with one or more peripheral devices by way of wireless communication links. For example, the peripheral device may be a remote control apparatus operable to receive a user input, responsive to which the peripheral device may send commands to a television or set-top box. As another example, the peripheral device may be a wireless mouse or keyboard communicatively coupled with a personal computer. Consumers generally expect such peripheral devices to be autonomously powered by batteries that seldom require recharge or replacement, and to be available for instant use (i.e., be configured to operate, responsive to a user input with imperceptible latency). Meeting such consumer expectations with a peripheral device having a small form factor may be challenging, particularly where the peripheral device is required to provide sophisticated communication and processing functionalities.

DETAILED DESCRIPTION

The present disclosure relates to peripheral devices that include (i) a manual or voice activated human interface with a user and (ii) a wireless interface with a remote electronic device (the "base device"). The peripheral device may typically be a battery-powered handheld or wearable device that includes or functions as a mouse, a keyboard, or a remote control, for example. The base device may be, for example, a computer, a personal electronic device such as a smart phone or tablet, or an electronic entertainment device such as a television or stereo, a set-top box, or a game console. The user provides inputs to the peripheral device so as to operate and control the base device. During intervals between the user inputs, the peripheral device may reduce power draw from its battery in a situationally aware manner. For example, the peripheral device may switch between a normal mode and a power saving mode based on a determination of a usage characteristic of the user (including where and/or when the inputs are being provided) and/or an operational mode of the base device.

For example, communications circuitry of the peripheral device may be put into a "sleep mode" after an interval of time expires without an input with the interval of time being user-specific based on the user's past interactions with the device and contingent on a the base device's operational mode. In some implementations, to reduce latency when the peripheral device switches from the sleep mode to the normal mode, a motion of the peripheral device may awake the peripheral device's communications circuitry in anticipation of a user input. Then, the device may restart an interval countdown in response to the device being moved, and then reenter the sleep mode after user-specific interval expires.

Figure 1:
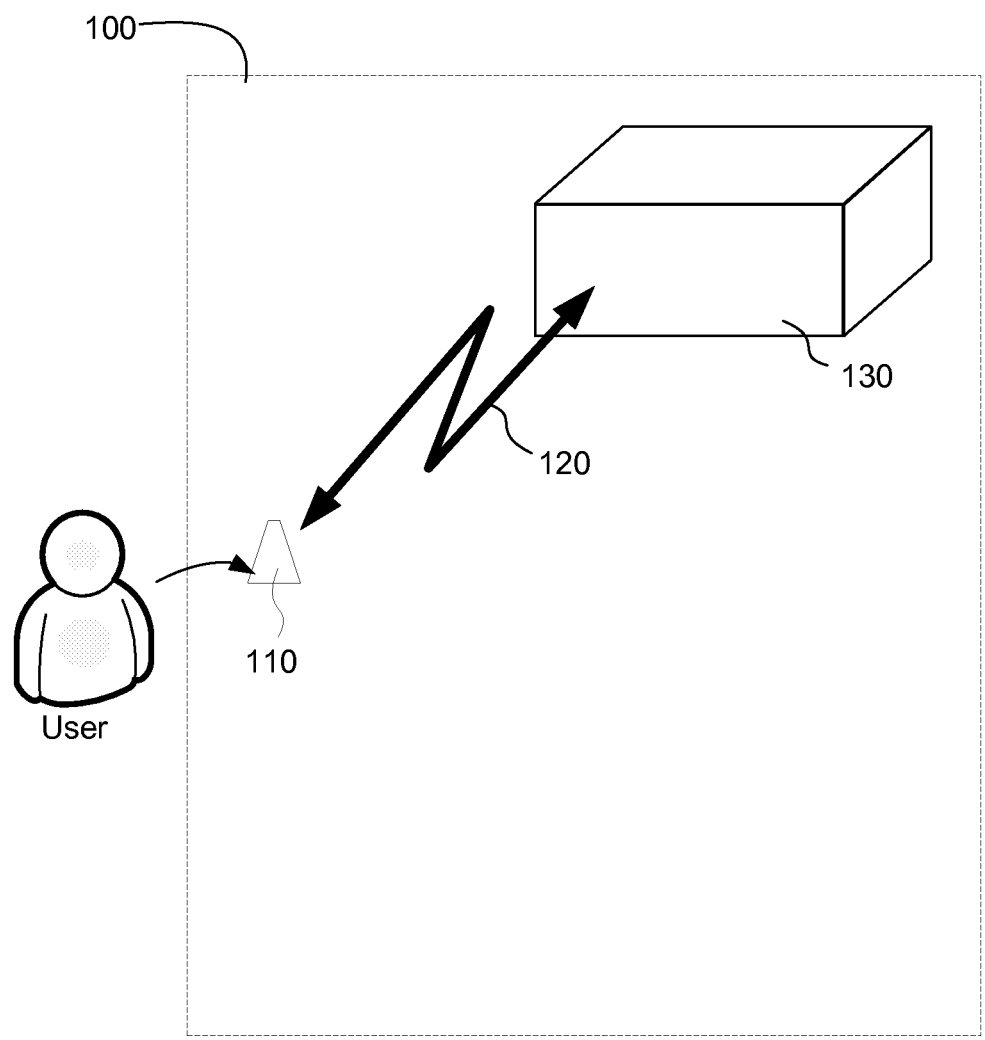
FIG. 1 is a simplified block diagram of a system including a peripheral device and a base device according to a particular class of implementations.

Referring now to FIG. 1, in the illustrated implementation, system 100 includes a peripheral device 110, and a base device 130. The peripheral device 110 and the base device 130 may be communicatively coupled by way of a communication link 120. The communication link 120 may conform to the Bluetooth or other personal area network wireless communication standard. In some implementations the communications link 120 may conform to one or more of the IEEE 802.11 ("Wi-Fi") standards, or another wireless standard suitable for use in a local area network, a personal area network, or a piconet.

A user may interact directly with the peripheral device 110 in order to operate or control the base device 130. The peripheral device 110, which may be handheld or wearable, for example, may be configured to receive inputs from the user. The peripheral device 110 may include or function as, for example, a mouse, a keyboard, a touchpad or a remote control. Inputs to the peripheral device 110 may be made manually by the user, for example. In addition or alternatively, in some implementations, the peripheral device 110 may be configured to recognize and respond to voice commands. Responsive to the user inputs, the peripheral device 110 may communicate with the base device 130 by way of the communications link 120.

The peripheral device 110 may include a battery. In some implementations, the battery may be a small, low capacity, button cell battery, for example. Desirably, the peripheral device 110 should be capable of operating for extended periods of time without a necessity to recharge or replace the battery. In order to reduce the power demands on the battery, the presently disclosed techniques contemplate that, during intervals between inputs from the user, power draw from the battery may be adaptively managed in a context-appropriate manner. More particularly, the peripheral device may be configured to switch between a normal mode and a power saving mode based on a determination of a usage characteristic of the user (including where and/or when the inputs are being provided) and/or the operational mode of the base device 130. Where the peripheral device is compliant with the Bluetooth standard, for example, the normal mode may correspond to the Bluetooth "Active" mode in during which the peripheral device 110 may actively participate over the communication link 120 with the base device 130. The power saving mode may be the Bluetooth Sniff Mode, Hold Mode, or Park Mode, for example and/or may include operating at a reduced bandwidth.

Figure 2:
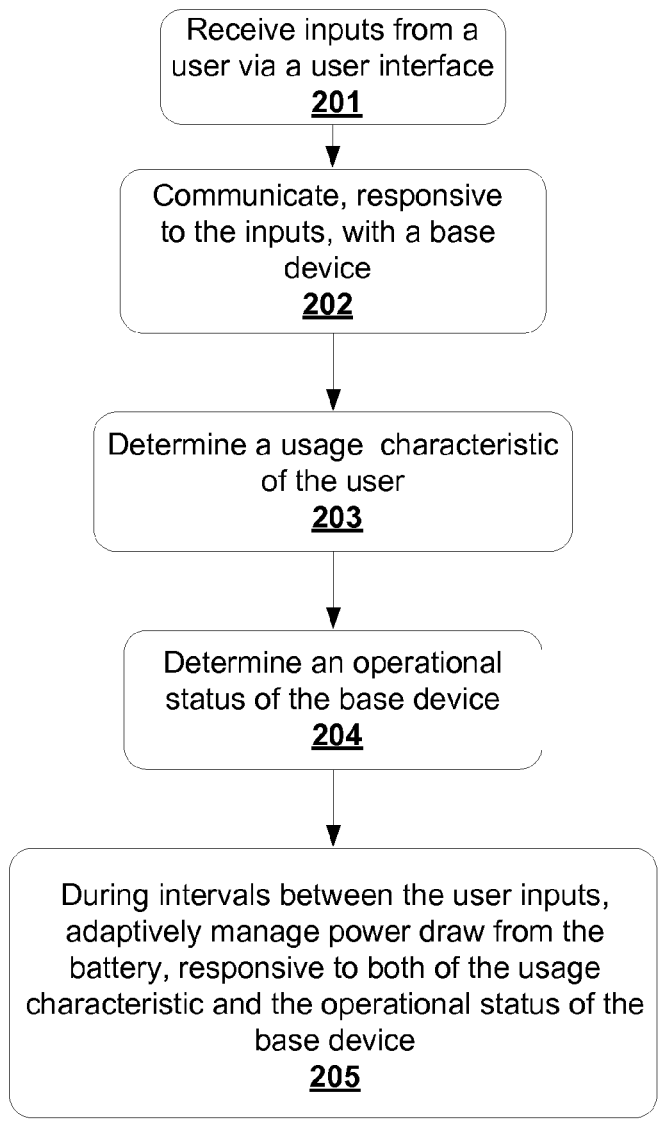
FIG. 2 is a simplified process flow diagram of a method for adaptively managing power draw from a battery of the peripheral device, according to an example implementation.

In some implementations, power draw of the peripheral device 110 may be adaptively managed by executing the process 200 illustrated in FIG. 2. At block 201 of the process 200, the peripheral device 110 receives user inputs. Responsive to the user inputs, the peripheral device 110 communicates with the base device 130, block 202. In some implementations, the peripheral device 110 functions as a controller of or input device for the base device. Accordingly, in such implementations, the user inputs may include, for example, pressing a key or a button, or pointing and clicking a mouse. Upon receiving the user input, the peripheral device 110 may send a communication to the base device 130 of a command or data stream corresponding to the user input.

It will be appreciated that the user inputs may be received, with varying temporal intervals therebetween, over varying periods of time. For example, where the peripheral device 110 is a television remote control and the base device 130 is a television, a relatively brief series of user button presses (as the user's inputs result in powering up the television and selecting a channel or other source of video content, for example) may be followed by a relatively long temporal interval with little or no user input (as the user watches a movie, for example). On the other hand, where the base device 130 is a game console, the user may control the game console by way of manual or verbal inputs that occur at a relatively high-frequency for a prolonged period of time. As a yet further example, where the peripheral device 130 is a Bluetooth-compatible mouse communicatively coupled with a base device 130 that is a computer, intervals between user inputs may vary as a function, for example, of whether the user is browsing the Internet, writing a document, interacting with a spreadsheet program, or playing a game.

Referring still to FIG. 2, at block 203 a first determination of a usage characteristic profile of the user may be made. In some implementations, the first determination may be made by the peripheral device 110. In some implementations, the first determination may be made by the base device 130 and communicated to the peripheral device 110 by way of communication link 120. In some implementations, the first determination may be made by another electronic device that is communicatively coupled to either or both of the peripheral device 110 and the base device 130. The first determination may be based at least in part on an identified usage characteristic of one or more users of the peripheral device 110. Since different persons will generally have different usage characteristics, such as a typical pattern of key press frequency and/or duration, the presently disclosed techniques contemplate that the first determination, in some implementations, enables distinguishing one user from another.

Over a period of time, for example, analysis of each user's particular usage characteristics may yield a discernible usage characteristic profile reflective of an individual user's habits and preferences. In some implementations, it is contemplated that the usage characteristic profile determined at block 203 may relate to a temporal interval between user inputs. As a result, the first determination may yield a prediction with regard to whether the user is likely to provide a further input to the peripheral device after an interval of time has elapsed since the user provided an input. For example, the usage characteristic profile may indicate that the user, after having provided one or more inputs to the peripheral device and then omitting to provide a further input for an interval of time greater than a user specific period, is unlikely to make a further input to the peripheral device.

In some implementations, the first determination may result from application of one or more of a variety of techniques drawn from the fields of machine learning (supervised and/or unsupervised) and/or computational intelligence, including association rule learning, evolutionary computation systems, and artificial neural networks, among others. Association rule learning relates to discovery of relations between variables. In the context of the present disclosure, association rule learning may include, for example, determining a relationship between a user input and an identity, preferences or usage patterns of the user.

Evolutionary computation refers to machine learning optimization and classification paradigms that may be based on evolutionary mechanisms such as biological genetics and natural selection.

An artificial neural network technique may include an analysis approach that is modeled to simulate the massively parallel structure of a biological neural network such as the human brain. For example, an artificial neural network may include a large number of relatively simple processing elements in that are interconnected by many weighted connections. The resulting computational structure may simulate, at least to some extent, the highly interconnected, parallel computational structure of a biological neural network.

Using techniques such as those described above, the peripheral device, or any electronic device communicatively coupled with the peripheral device, may be configured to adaptively associate a usage characteristic of a particular user and/or with a particular type of activity in which the user may be engaged. As a result, a respective usage characteristic profile may be associated with each particular user, and/or with each of a variety of activities.

Referring still to FIG. 2, at block 204 a second determination of an operational mode of the base device 130 may be made. In some implementations, the second determination may be made by the peripheral device 110. In some implementations, the second determination may be made by the base device 130 and communicated to the peripheral device 110 by way of communication link 120. In some implementations, the first determination may be made by a second electronic device (not illustrated) that is communicatively coupled to either or both of the peripheral device 110 and the base device 130. The second electronic device may be operating within the local area network, personal area network, or piconet of which communication link 120 is a part, or may be a remote server, for example. The second determination may be based at least in part on information related to the nature and functional mode of the base device 130. For example, if the base device 130 is a television, relevant information may include whether the television is playing back video content or displaying an on-screen menu with which the user may wish to interact. As a further example, if the base device 130 is a computer, relevant information may include the number and types of programs being currently run. As a yet further example, if the base device 130 is a game console, relevant information may include whether the game console is in a standby, set-up or game play mode, and, if in a game play mode, the nature of the game.

At block 205, during intervals between the user inputs, power draw from the battery of the peripheral device 110 may be adaptively managed. For example, responsive to the first determination and the second determination, the peripheral device 110 may automatically switch between a normal mode and a power saving mode responsive to both of the usage characteristic of the user and the operational mode of the base device. It is contemplated that the power saving mode may be a low power (e.g., sleep or standby) mode In accordance with the Bluetooth specification, for example, the power saving mode may include Sniff Mode, Hold Mode, and Park Mode.

Thus, according to the presently disclosed techniques, a decision whether or not to enter such a power saving mode is based on a dynamically adaptive strategy that takes into account the context in which the peripheral device 110 is being operated, including usage characteristics of the user and/or the base device. For example, if an interval between key presses for user A is characteristically T1 seconds and for user B is characteristically T2 seconds, a time period for entering the power saving mode may be set accordingly for each respective user. For example, the peripheral device may be caused to enter the power saving mode after T1 seconds elapse without an input from user A or after T2 seconds elapse after an input from user B. Alternatively, or in addition, in some implementations, the peripheral device may be caused to enter the power saving mode immediately after an input from user A and switch to the normal mode shortly before T1 seconds elapse from the input. As a result, battery life may be enhanced without perceptible impact to the responsiveness of the peripheral device.

Figure 3:
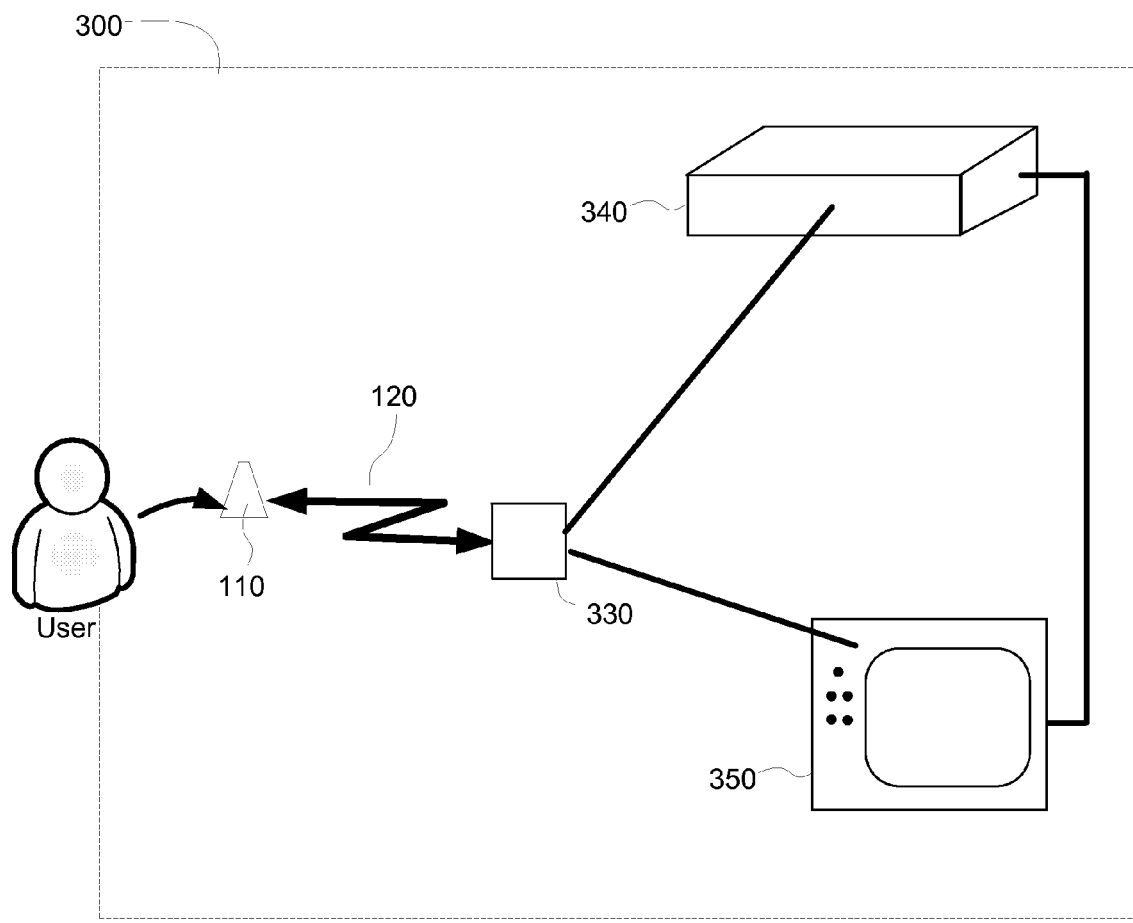
FIG. 3 is a simplified block diagram of a system including a peripheral device and a base device according to another class of implementations.

Referring now to FIG. 3, another implementation of the presently disclosed techniques is illustrated. In the illustrated implementation, system 300 includes peripheral device 110, communicatively coupled with a base device 330 by way of the communication link 120. As described hereinabove, in some implementations the communication link 120 may be a Bluetooth communication link.

The user may interact directly with the peripheral device 110 in order to operate or control the base device 330. In the illustrated implementation, the base device 330 is communicatively coupled with an electronic device 340 and a television 350. Electronic device 340 may be a set-top box, for example, or a game console. The electronic device 340 and the television 350 may be communicatively coupled with each other and with the base device 330 wirelessly, or by way of wires or coaxial cables or the like.

In some implementations, system 300 may be a home entertainment system, for example, and it may be expected that multiple users (e.g., various members of a family or household) may separately use the peripheral device 110 to control the system 300 at various times. At least in such user case scenarios, the presently disclosed techniques contemplate that the peripheral device may switch between a normal mode and a power saving mode based on a determination of the context of a user input, including where and/or when the input is being provided. For example, the time of day and/or day of week that a user enters his/her inputs may be combined with information related to a previously identified usage pattern to assist in making the determination. Similarly, a physical and/or logical location of the peripheral device, including, for example whether it is located in or communicating with a base device located in a home office, a bedroom or a living room, may be utilized in making the determination.

Figure 4:
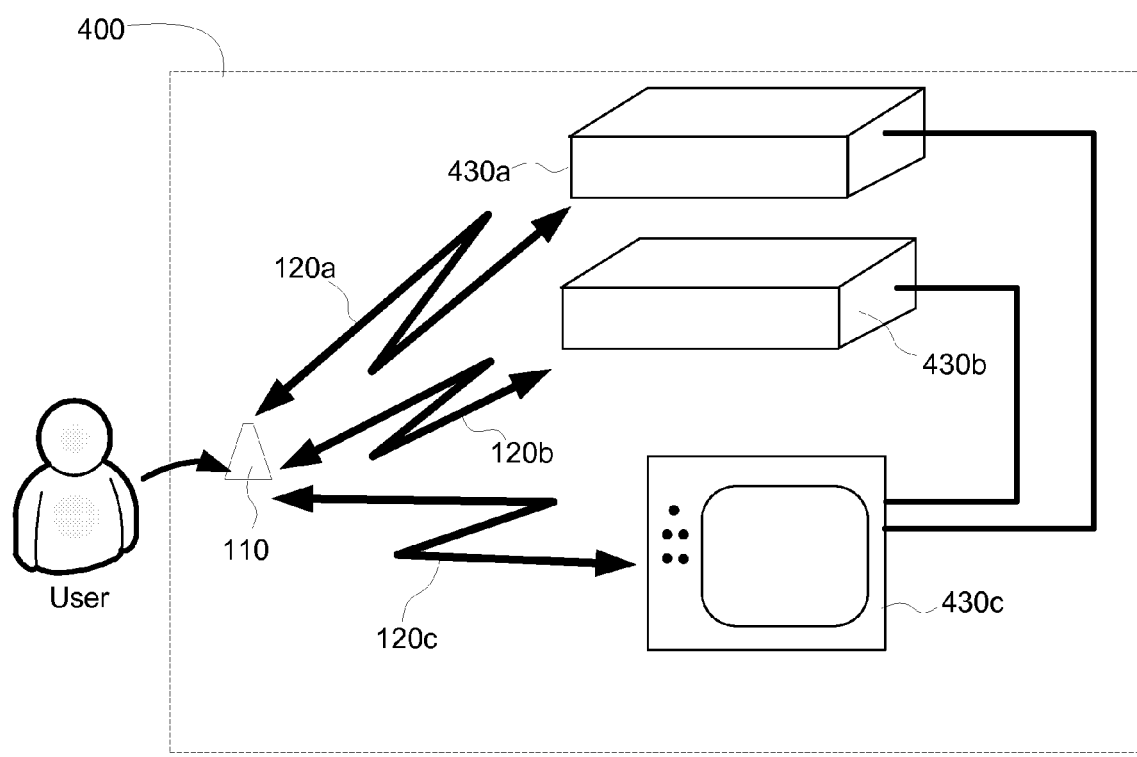
FIG. 4 is a simplified block diagram of a system including a peripheral device and a base device according to a further class of implementations.
Figure 5:
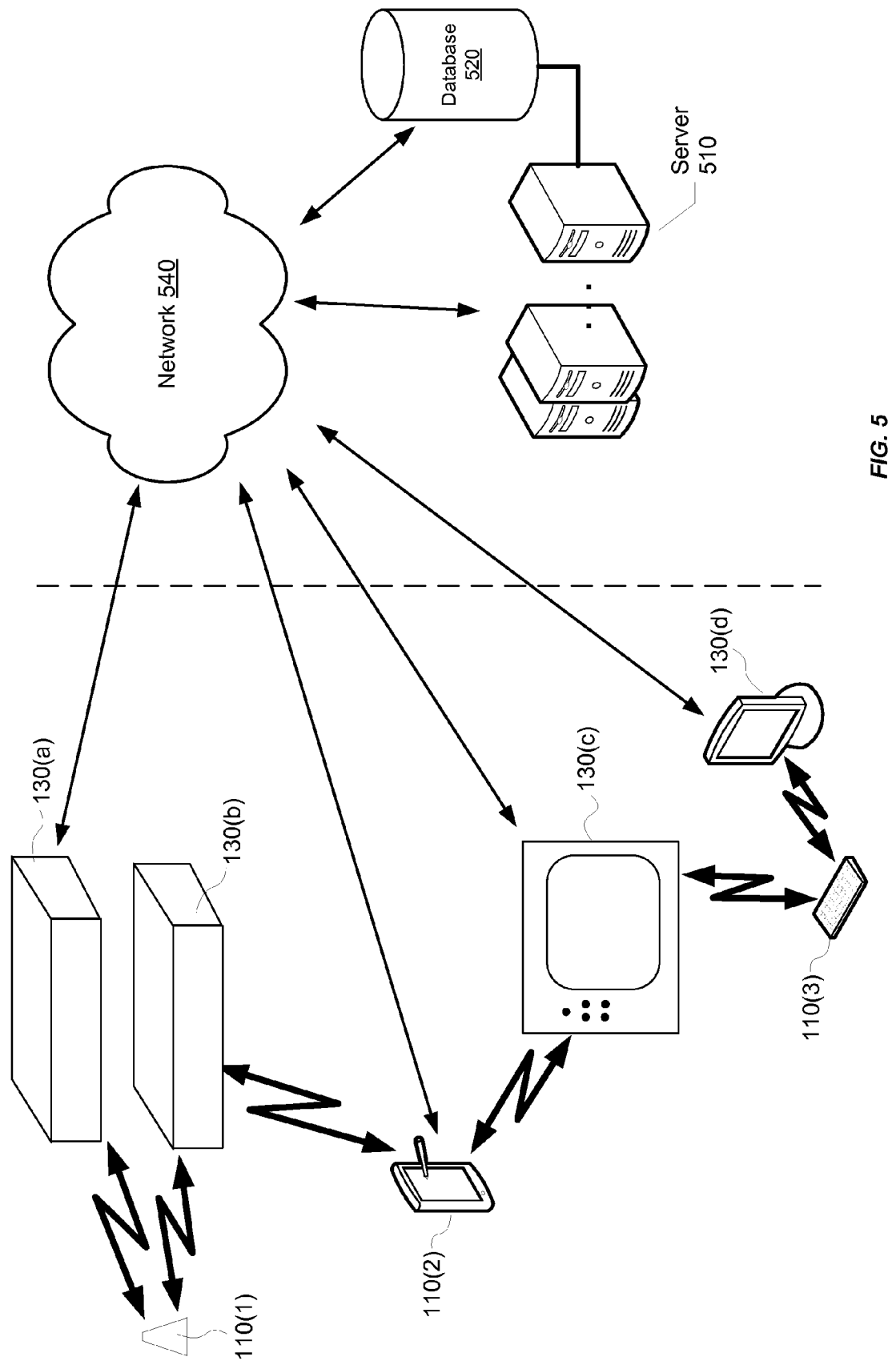
FIG. 5 is a simplified block diagram of a system including a peripheral device and a base device coupled with a central database and back-end server.

Referring now to FIG. 4, another implementation of the presently disclosed techniques is illustrated. In the illustrated implementation, system 400 includes peripheral device 110, which may be selectably communicatively coupled with one or more of a first base device 430a by way of first communication link 120a, a second base device 430b by way of second communication link 120b and a third base device 430c by way of third communication link 120c. In a user case scenario illustrated by FIG. 4, the peripheral device 110 may function as a "universal remote" and be enabled to control each of the first base device 430a, the second base device 430b, and the third base device 430c. In the illustrated implementation, the base device 430c is a television, whereas the first base device 430a may be a set-top box communicatively coupled with a cable or broadcast TV service provider, for example, and a second base device 430b may be a game console.

As indicated above, the presently disclosed techniques contemplate that the peripheral device 110 may switch between a normal mode and a power saving mode based on a determination of the context of a user input, including where and/or when the input is being provided. In addition, the peripheral device 110 may switch between a normal mode and a power saving mode based on a determination of an operational mode of the base device with which the peripheral device is communicatively coupled. "Operational mode", as the term is used herein, and in the claims, may refer to a power mode status (e.g., on/off/standby) and/or an operating mode status (e.g., what the base device is doing, such as playing a movie, running a game program, displaying graphical user interface, etc.). As a further example, when the base device is a computer, the operational mode may include information regarding the type and quantity of open programs and/or documents, as well as the currently active programs and/or documents.

As indicated above, the presently disclosed techniques contemplate that multiple users (e.g., various members of a family or household) may separately use the peripheral device 110 at various times. In some implementations, one or more of the users are anonymous to the peripheral device 110. That is, the peripheral device 110 may have no a priori information as to the user's identity, preferences, habits, or other usage characteristics. As such an anonymous user begins to interact with the peripheral device 110; however, a comparison may be made between the anonymous user's inputs and the usage characteristics of previous users. As a result of the comparison, a determination may be made of the likely usage characteristics of the anonymous user. In the context of a home entertainment system, for example, where a first user is a habitual "channel surfer" and a second user is not, the first user's usage characteristics and the second user's usage characteristics may be separately correlated with each user without a need of knowing any user's actual identity.

As a further example, still in the context of a home electronics system, a determination of the likely usage characteristics of the anonymous user may be based on the status of the base device 130 and/or when and where the interaction is occurring. Thus, in some implementations, where the base device 130 is a computer located in a home office and the interaction is occurring at a particular time of day, for example, the likely usage characteristics of the anonymous user may be assumed to be identical to those of a previous user who has interacted with the computer at a similar time of day. As a still further example, where the base device 130 is a game console located in a family member's bedroom, the likely usage characteristics of the anonymous user may be assumed to be identical to those of a previous user who has interacted with the game console.

An example of a data structure that may be used to facilitate user identification and to make determinations whether or not to switch between a normal mode and a power saving mode is illustrated in Table I below.

TABLE I

| Operating mode of Base Device | Observed Characteristic | | User 1 | User 2 | User 3 |
|---|---|---|---|---|---|
| A. Set top box of TV presenting a movie | Interval between user inputs (sec) | Min | 1 | . . . | . . . |
| | | Max | 30 | . . . | . . . |
| | | Ave | 10 | . . . | . . . |

TABLE I-continued

| Operating mode of Base Device | Observed Characteristic | | User 1 | User 2 | User 3 |
|---|---|---|---|---|---|
| | | Std Dev | 5 | ... | ... |
| B. Set top box of TV displaying a GUI | Interval between user inputs (sec) | Min | 2 | ... | ... |
| | | Max | 10 | ... | ... |
| | | Ave | 5 | ... | ... |
| | | Std Dev | 3 | ... | ... |
| . | | | | | |
| . | | | | | |
| . | | | | | |

The data structure may be associated with a user profile stored in non-transitory memory of one or more devices, such as peripheral devices 110, base devices 130, and/or remotely located network storage devices (such as those used to store other types of user profiles used for retail, financial, entertainment and/or other purposes). For example, in response to determining a specific user is using a peripheral device (some examples of how to determine the user are provided below), the user profile or portion thereof (e.g., data structure) can be sent from the remotely located network storage devices to the peripheral device 110 and/or base device associated therewith, if the most up-to-date version of the data structure for that user is currently absent from the peripheral device and/or base device being currently used.

Figure 6:
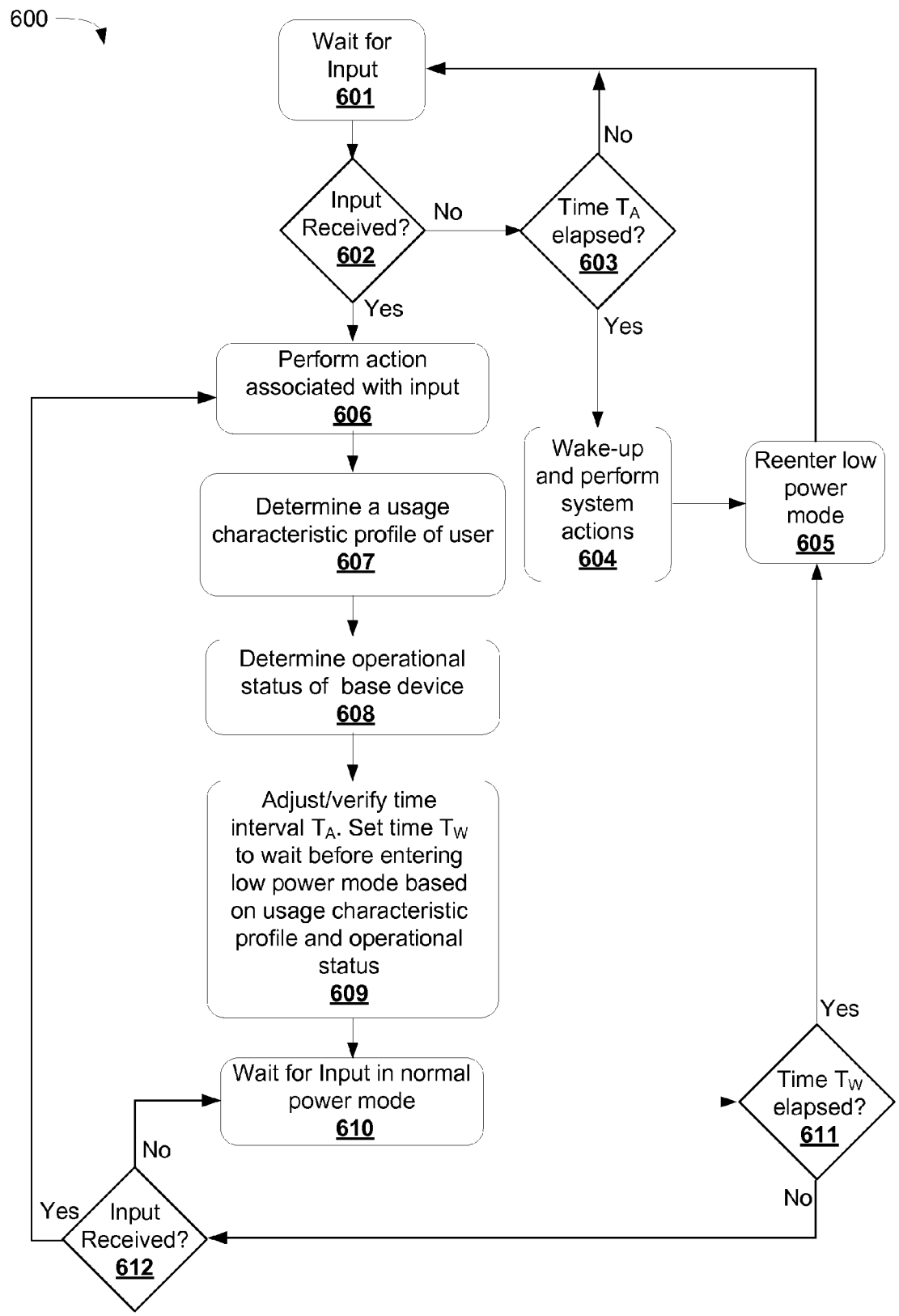
FIG. 6 is a simplified process flow diagram of a method for adaptively managing power draw from a battery of the peripheral device, according to an example implementation.

FIG. 6 illustrates an example of how the data structure of Table I may be centrally managed and distributed across multiple devices (such as a game controller and simple remote control) used by a particular group of users (such as a household, for example). In the illustrated implementation, the data structure may be stored in database 520, and may be accessed by one or more servers 510. The server 510, which may be referred to as a "back-end server", and database 520 may be communicatively coupled with network 540. Network 540 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. In an arrangement of peripheral devices 110 and base devices 130, one or more of each of the peripheral devices and the base devices may also be communicatively coupled with the network 540. In the illustrated implementation, for example, peripheral devices 110 (2), and base devices 130(a), 130(c), and 130(d) are communicatively coupled with network 540. As a result, at least peripheral devices 110 (2), base devices 130(a), 130(c), and 130(d) may obtain a user profile from database 520 and/or cause the user profile in database 520 to be updated.

For each of several operating modes of one or more base devices, observed characteristics of users may be obtained. One observed characteristic may be duration of temporal intervals between user inputs. For a particular user, such durations may be recorded during the course of a session or multiple sessions. Statistical information, such as minimum, maximum, average, and standard deviation of the interval durations may be determined. In the (relatively) simple illustrated example A, such statistical information may be used to make a determination that User 1, after 30 seconds have elapsed since a most recent input to the peripheral device when the television set-top box is presenting a movie, is very unlikely to make a second input soon. As a result, it may be determined to place the peripheral device into a low-power mode. Referring now to example B, the statistical information may be used to make a determination that User 1, having made a first input to the peripheral device when the television set-top box is displaying a graphical user interface, is very unlikely to make a second input sooner than two seconds after the first input. As a result, it may be determined to place the peripheral device into a low-power mode for at least two seconds after each input by a User 1.

Referring now to FIG. 6, an example method 600 for managing power draw of a peripheral device will be described. At block 601, the peripheral device is waiting for an input from a user. It is assumed that the peripheral device is waiting in a low-power mode, for example, a Bluetooth sniff mode, hold mode or park mode. At block 602 a determination may be made as to whether or not an input has been received from the user. If the determination at block 602 is that a user input has not been received, the method may proceed to block 603. At block 603, a determination may be made as whether or not a time interval $T_A$ has been elapsed. If the determination is that time $T_A$ has been elapsed the method may proceed, at block 604, to cause the peripheral device to perform a required system action. Thus, time interval $T_A$ may be associated with a specified time interval between required system actions. For example, if the low-power mode is the Bluetooth sniff mode, periodic resynchronization between a slave device and a master device is required at so-called Anchor Points separated by predetermined time intervals. Thus, in some implementations, upon expiration of time $T_A$ the peripheral device may be required to wake up, and exchange packets of data sufficient to resynchronize with another Bluetooth device with which it is communicatively coupled.

Following execution of block 604, the peripheral device may reenter the low-power mode and the method 600 may return to block 601. Similarly, if the determination at block 603 is that time $T_A$ has not been elapsed, the method 600 may return to block 601.

If the determination at block 602 is that a user input has been received, the method may proceed to block 606 and perform an action associated with the user input. For example, where the peripheral device is operating as a television remote control, a user input of depressing a power on button may result in the peripheral device sending a signal to the television to enter a full power mode.

Following block 606, a determination may be made at block 607 regarding a usage characteristic profile for the user. For example, as discussed above, an identity and/or usage pattern of the user may be recognized.

At block 608, an operational status of the base device may be determined. For example, where the base device is a computer, operational status information may include the power status of the computer or the number and types of programs being currently open on the computer.

At block 609, based on the determinations made at blocks 607 and 608 the time interval $T_A$ may be verified as correct or adjusted. For example, the time interval $T_A$ may be extended in the event that the determinations at blocks 607 and 608 indicate that it is safe to do so. In addition, at block 609, wait time interval $T_W$ may be set (or changed from a default value) based on the determinations made at blocks 607 and 608. Time interval $T_W$ relates to a period of time after which the peripheral device may be caused to enter a low-power mode.

At block 610, the peripheral device waits for user input in the normal power mode. If a determination is made at block 611 that time interval $T_W$ has elapsed the peripheral device may be caused to enter the low power mode, block 605. If the determination at block 611 is that time interval $T_W$ has not elapsed, a determination is made at block 612 as to whether or not a user input has been received. If the determination at block 612 is that a user input has not been received, the method may return to block 610. If the determination at block 612 is that a user input has been received, the method may return to block 606.

In some implementations, the identity and/or preferences of a user may be expressly registered. For example, the identity of a purchaser of the peripheral device 110 or the base device 130 may be registered at the time of purchase, and associated with a user profile. Alternatively or in addition, a user may be given an opportunity to register his/her identity and/or preferences during an interaction with the peripheral device 110 or the base device 130, which may supplement or create a new user profile. In such implementations, usage characteristics may include such expressly registered identity and preference information. The expressly registered identity and preference information along with other user profile information may be stored locally on the peripheral device or the base device or may be stored remotely, for example, in a cloud-based environment. The expressly registered identity may include or be associated with one or more of the user's e-mail address, telephone number(s), account number(s) and a serial number of the peripheral device, for example.

In some implementations, the identity of the user may be determined using voice recognition techniques. For example, where the peripheral device is a Bluetooth headset, remote control and/or other peripheral device, a voice recognition capability may be incorporated in the peripheral device, in a base device and/or in one or more remotely located devices to which the peripheral device is communicatively coupled through one or more devices.

Put simply, the present techniques relate to adaptively managing power draw from a battery of a peripheral device based on a real-time situational awareness, that may be obtained from several components, of a user's usage characteristics, and status of the base device with which the peripheral device is communicatively coupled.

In some implementations, usage characteristics include expressly entered inputs by the user. Expressly entered inputs may include, for example, identity information and preference settings that may be intentionally input by the user (initially and/or from time to time), and operational inputs (e.g. key presses, mouse clicks, verbal commands, and the like).

Additionally or alternatively, usage characteristics may be obtained based on inadvertent or incidental inputs of which the user may not necessarily be aware. For example, the peripheral device, and/or base devices with which the peripheral device is communicatively coupled may include a number of sensors operable to detect such inadvertent or incidental inputs. In some implementations, the peripheral device may include an accelerometer, orientation sensor, proximity sensor and/or motion sensor, outputs of which may be used to determine whether the peripheral device is in a user's hand or resting on a table. To reduce latency, a sensed motion of the peripheral device may be used as a signal to switch from the power saving mode to the normal mode in anticipation of a user input.

As a further example, the peripheral device and/or the base device may include a camera and/or audio receptor, outputs of which may enable a visual or aural identification of the user to be made. As another example, the peripheral device and/or a base device with which it is communicatively coupled may include an ambient light sensor (ALS) capable of detecting intensity and/or color of ambient light. Outputs of the ALS may be indicative of the user's physical location and/or the type of activity the user may be engaging in or about to engage in. Elaborating on this example, it may be contemplated that when a user who has been watching TV in a darkened room, turns on a light, the ALS enables the change in light level to be recognized, and in response a determination may be made to switch the peripheral device from the power saving mode to the normal mode. In some implementations, the peripheral device will be communicatively coupled with two or more base devices, as illustrated in FIG. 4, for example.

More generally, it is contemplated that, in some implementations, the peripheral device will be part of a local area network, such as a Wi-Fi network, or personal area network such as Bluetooth, IrDA, Wireless USB, Z-Wave and ZigBee. As a result, the peripheral device may be communicatively coupled not only with the base device with which the user is currently interacting but also with one or more other devices on the network, including other peripheral devices. As a result, a determination of usage characteristics may be at least partially based on information obtained from these other devices. This information may include, for example, the user's calendar information, or whether or not the user is using a cell phone, or other electronic device independently of the peripheral device, or inputs the user has made on another peripheral device. In some implementations, therefore, status of all electronic devices within the network may be considered in making a determination of usage characteristics.

As a use-case example of how such information may be used, where the peripheral device is a Bluetooth remote control communicatively coupled with a television set-top box, the Bluetooth remote control may also be communicatively coupled, directly or indirectly, with one or more other devices in the Bluetooth network, such as a user's personal electronic device, a smart phone, laptop or a personal computer. A determination whether or not to switch the Bluetooth remote control between the power saving mode and the normal mode may take the operational status of these other devices into account. For example, a determination may be to refrain from switching the Bluetooth remote control from the power saving mode to the normal mode while the user is engaged in a telephone call our interacting with user's laptop, and to switch from the power saving mode to the normal mode only when the user ceases those other activities.

Figure 7:
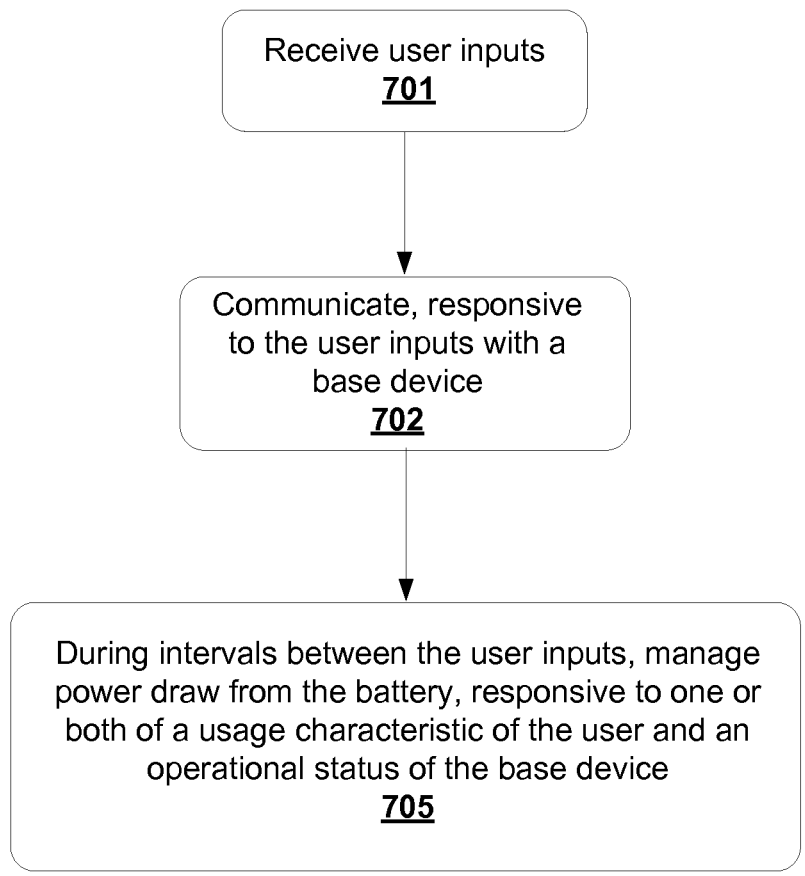
FIG. 7 is a simplified process flow diagram of a method for adaptively managing power draw from a battery of the peripheral device, according to another example implementation.

In some implementations, power draw of the peripheral device 110 may be adaptively managed by executing the process 700 illustrated in FIG. 7. At block 701 of the process 700, the peripheral device 110 receives user inputs. Responsive to the user inputs, the peripheral device 110 communicates with the base device 130, block 702.

User inputs may be received, with varying time intervals therebetween, over varying periods of time. For example, where the peripheral device 110 is a television remote control and the base device 130 is a television or device connected thereto (e.g., television set-top box), a relatively brief series of user button presses (for example, one to a few dozen button presses over a few minutes as the user's inputs result in powering up the television and selecting a channel or other source of video content, for example) may be followed by a relatively longer interval of half an hour to two hours with little or no user input (as the user watches a television program or a movie, for example). On the other hand, where the base device 130 is a game console, the user may control the game console by way of manual or verbal inputs that occur at a relatively high-frequency for a prolonged period of time, of many minutes or a few hours. As a yet further example, where the peripheral device 130 is a Bluetooth-compatible mouse communicatively coupled with a base device 130 that is a computer, intervals between user inputs may vary as a function, for example, of whether the user is browsing the Internet, writing a document, interacting with a spreadsheet program, or playing a game.

The user inputs may also indicate information regarding a nature and functional mode of the base device 130, or this information may be received from the base device 130. For example, if the base device 130 is a television, relevant information may include whether the television is playing back video content or displaying an on-screen menu or graphical user interface (GUI) with which the user may wish to interact. If the television is playing back video content, a determination to enter and remain in a power saving mode may be made more aggressively in order to minimize battery power usage of the peripheral device because the user may be unlikely to actuate the peripheral device. Contrariwise, where the television is displaying a GUI which invites user interaction, a determination to enter a power saving mode may be made more conservatively. As a further example, if the base device 130 is a computer, relevant information may include the number and types of programs being currently run. A user browsing the Internet, for example, may be expected to use a Bluetooth keyboard at a much less frequent rate than a user entering data into a spreadsheet, for example. Similarly, if the base device 130 is a game console, a rate with which the user interacts with the peripheral device may vary depending on whether the game console is in a standby, set-up or game play mode, and, if in a game play mode, the nature of the game.

At block 705, during an interval between the user inputs, power draw from the battery of the peripheral device 110 may be managed. The interval may range from a fraction of a second to several minutes, or hours. For example, responsive to one or both of a usage characteristic of the user and an operational mode of the base device 130, the peripheral device 110 may automatically switch between a normal mode (e.g., a Bluetooth Active Mode) and a power saving mode (e.g., a Bluetooth Sniff, Hold or Park Mode). It is contemplated that the power saving mode may be a sleep mode, standby mode, or a "sniff" mode, for example. In some implementations managing power draw from the battery includes taking into account the power status of the battery, for example whether the battery is fully charged, 50% charged, etc.

As described hereinabove, the peripheral device may typically be a battery-powered handheld or wearable device that includes or functions as a mouse, a keyboard, or a remote control, for example. The base device may be, for example, a computer, a personal electronic device such as a smart phone or tablet, or an electronic entertainment device such as a television or stereo, a set-top box, or a game console. More generally, the peripheral device and the base device are electronic devices that are communicatively coupled via a personal area network (PANs), local area network (LANs) or wide area network (WANs).

Figure 8:
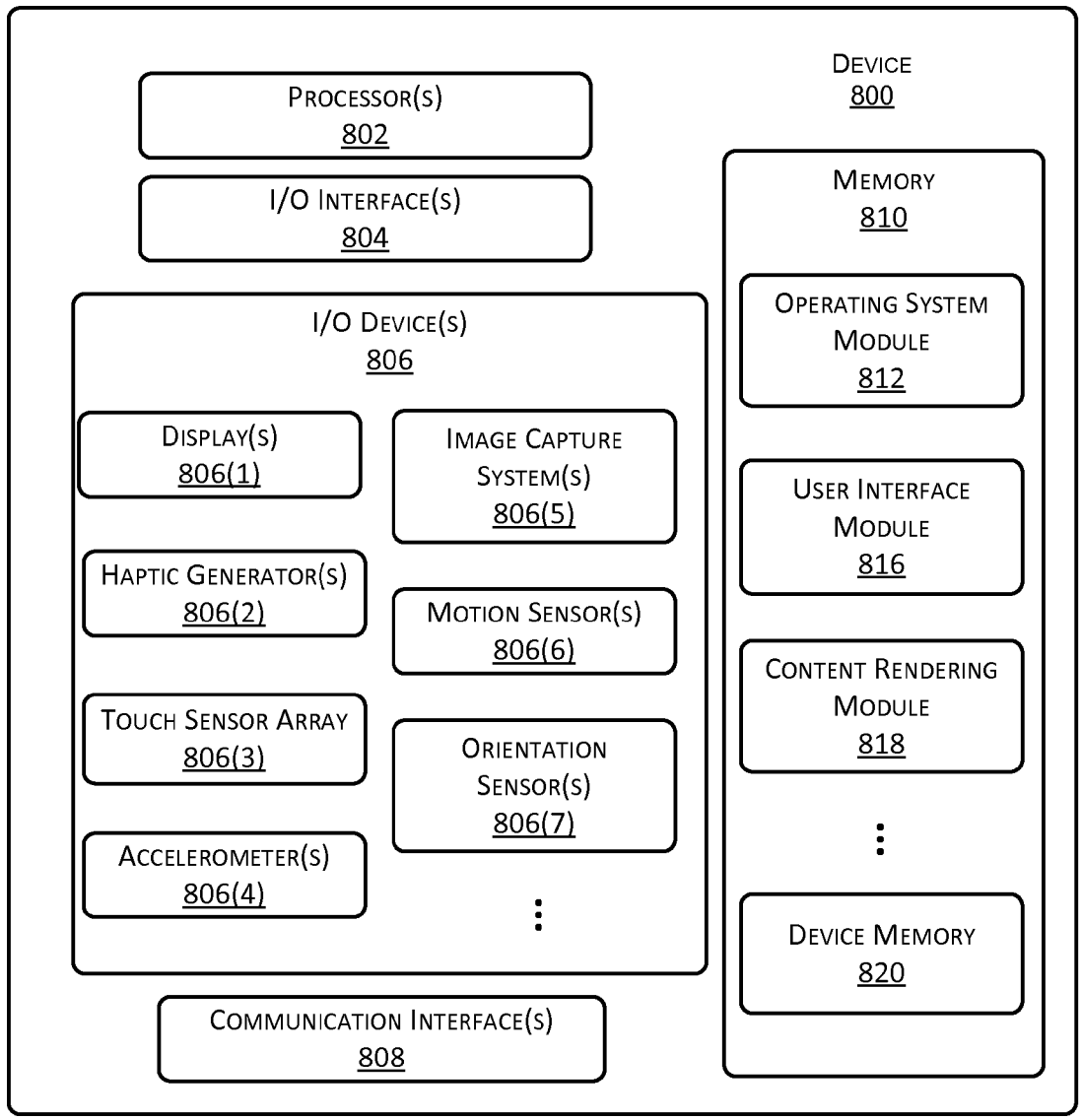
FIG. 8 illustrates a block diagram of an example of an electronic device with which the presently disclosed techniques may be employed.

A block diagram of an example of such electronic devices is shown in FIG. 8. Device 800 may also include one or more input/output (I/O) interface(s) 804 to allow the device to communicate with other devices. I/O interfaces 804 may include, for example, an inter-integrated circuit (I2C) interface, a serial peripheral interface (SPI) bus, a universal serial bus (USB), an RS-232 interface, a media device interface, and so forth. I/O interface(s) 804 is coupled to one or more user I/O devices 806. The I/O device(s) 806 may include one or more displays 806(1), one or more haptic generators 806(2), a touch sensor array 806(3), one or more accelerometers 806(4), one or more image capture systems 806(5), one or more motion sensors 806(6), one or more orientation sensors 806(7), microphones, speakers, and so forth. Although the peripheral device of the present disclosure may not necessarily include each of the above mentioned user input devices, it is contemplated that expressly entered user inputs as well as inadvertent or incidental inputs such as may be detected by motion sensors 806(6) or image capture systems 806(5) may be registered and used in making a determination to switch between a power saving mode and a normal mode, as described above. The one or more displays 806(1) are configured to provide visual output to the user and may comprise any of a variety of display types including, for example, any type of reflective or transmissive display. Touch sensor array 806(3) may be a capacitive sensor array having a matrix of conductors that are scanned to determine, for example, the location, duration, speed and direction of touch events within the matrix based on changes in electrical capacitance.

Device 800 may also include one or more communication interfaces 808 configured to provide communications between the device and other devices. Such communication interface(s) 808 may be used to connect to cellular networks, personal area networks (PANs), local area networks (LANs), wide area networks (WANs), and so forth. For example, communications interfaces 808 may include radio frequency modules for a 3G or 4G cellular network, a Wi-Fi LAN and a Bluetooth PAN by way of which communications with base device 130 may be carried out, for example. Device 800 also includes one or more buses or other internal communications hardware or software that allow for the transfer of data and instructions between the various modules and components of the device.

Device 800 may also include one or more memories (e.g., memory 810) and processors 802. Memory 810 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 810 provides storage for computer readable instructions, data structures, program modules and other data for the operation of device 800. Memory 810 may include at least one operating system (OS) module 812 configured to manage hardware resources such as I/O interfaces 804.

User interface module 816 is configured to present a user interface to the user that may include visual, audible, and/or haptic components. For example, user interface module 816 may be configured to present, in conjunction with content rendering module 818, an image on display 806(1). User interface module 816 may also be configured to process user inputs of applied forces (e.g., touch events, swipes, etc.) at particular locations on the display to take particular actions such as, for example, paging forward or backward through paged content, zooming in and out, panning, etc., and/or receive user inputs related to user identity, preferences, etc.

Memory 810 may also include device memory 820 to store a wide variety of instructions and information using any of a variety of formats including, for example, flat files, databases, linked lists, trees, or other data structures. In some implementations, a portion of device memory 820 may be distributed across one or more other devices including servers, network attached storage devices, and so forth.

The presently disclosed techniques may include computer program instructions to adaptively manage power draw from the battery of the peripheral device based on a real-time situational awareness may be implemented in a variety of ways. For example, they could be part of the native display controller logic of device 800. Alternatively, they could be implemented as a separate application that may be downloaded to the device. In another alternative, where device 800 is a thin client, at least some of the instructions may be hosted on a remote platform. It will also be understood that device 800 of FIG. 8 is merely an example of a device with which various implementations of the present invention may be practiced, and that a wide variety of other devices types may also be used. The scope of the invention should therefore not be limited by reference to device-specific details discussed above.

Examples of some of these implementations are illustrated in the accompanying drawings, and specific details are set forth in order to provide a thorough understanding thereof. It should be noted that implementations may be practiced without some of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method comprising:
    receiving, on a Bluetooth remote control device that includes a human user interface and a battery, a first set of inputs from a user via the user interface, the first set of inputs having first temporal intervals, each of the temporal intervals being between a pair of consecutive inputs in the first set of inputs;
    responsive to the first set of inputs, communicating with a television set-top box by way of a Bluetooth communication link, the television set-top box being in a first operational mode that includes displaying a graphical user interface;
    measuring durations of the first temporal intervals;
    generating a first usage characteristic profile for the user by correlating the durations of the first temporal intervals with the first operational mode of the television set-top box and an identity of the user, wherein the first usage characteristic profile specifies a first power down time interval after which the Bluetooth remote control device is to reduce power draw from the battery by entering a power saving mode;
    saving the first usage characteristic profile;
    causing the Bluetooth remote control device to enter the power saving mode based on the saved first usage characteristic profile;
    receiving, on the Bluetooth remote control device, a second set of inputs from the user via the user interface, the second set of inputs having second temporal intervals between pairs of consecutive inputs in the second set of inputs;
    responsive to the second set of inputs, communicating with the television set-top box by way of the Bluetooth communication link, the television set-top box being in a second operational mode that includes presenting a movie;
    measuring durations of the second temporal intervals;
    generating a second usage characteristic profile for the user by correlating the durations of the second temporal intervals with the second operational mode of the television set-top box and the identity of the user, wherein the second usage characteristic profile specifies a second power down time interval after which the Bluetooth remote control device is to reduce power draw from the battery by entering the power saving mode;
    saving the second usage characteristic profile; and
    causing the Bluetooth remote control device to enter the power saving mode based on the saved second usage characteristic profile.

2. The method of claim 1, further comprising determining, independently for each of a plurality of users, a respective usage characteristic profile, each respective usage characteristic profile identifying a respective first criterion and a respective second criterion for determining whether to switch between a power saving mode and a normal mode.

3. A peripheral device, comprising:
    a user interface; and
    a battery; wherein:
        the peripheral device is configured to communicate with a base device, by way of a wireless communication link, responsive to inputs received via the user interface; and
        the user interface is communicatively coupled with one or more processors configured to:
            create a usage characteristic profile for at least one user by correlating a temporal spacing of a first set of inputs received at the user interface with at least one of (i) a first operational mode of the base device or (ii) an identity of the at least one user;
            save the usage characteristic profile; and
            cause the peripheral device to reduce power draw from the battery by switching between a normal mode and a power saving mode when a time interval after a most recent user input meets a criterion identified by the usage characteristic profile.

4. The peripheral device of claim 3, wherein the criterion identified by the usage characteristic profile includes a power down criterion specifying a power down time interval at which the peripheral device is to be switched from a normal mode to a power saving mode.

5. The peripheral device of claim 4, wherein the criterion identified by the usage characteristic profile includes a power up criterion specifying a power up time interval at which the peripheral device is to be switched from a power saving mode to a normal mode.

6. The peripheral device of claim 4, wherein the normal mode includes a Bluetooth active mode and the power saving mode includes one of a Bluetooth sniff mode, a Bluetooth hold mode, and a Bluetooth park mode.

7. The peripheral device of claim 3, wherein the one or more processors are configured to create the usage characteristic profile for the at least one user, the usage characteristic profile identifying the criterion, by:
    receiving, on the peripheral device, the first set of inputs from the at least one user via the user interface, the first set of inputs having a first set of respective temporal intervals between each pair of consecutive inputs in the first set of inputs;
    measuring durations of the respective temporal intervals in the first set of respective temporal intervals; and
    creating the first usage characteristic profile for the at least one user by correlating the measured durations of the respective temporal intervals in the first set of respective temporal intervals with the first operational mode of the base device and the identity of the at least one user.

8. The peripheral device of claim 3, wherein the one or more processors are further configured to create the usage characteristic profile for the at least one user by:
    receiving, on the peripheral device, a first set of inputs from the at least one user via the user interface, the second set of inputs having a second set of respective temporal intervals between each pair of consecutive inputs in the second set of inputs, the base device being in a second operational mode;

measuring durations of the respective temporal intervals in the second set of respective temporal intervals; and creating a second usage characteristic profile for the at least one user by correlating the measured durations of the respective temporal intervals in the second set of respective temporal intervals with the second operational mode of the base device and the identity of the at least one user.

9. The peripheral device of claim 8, wherein the one or more processors are further configured to switch between the normal mode and the power saving mode with reference to one or both of the first operational mode and the second operational mode of the base device, wherein the first and second operational modes include one or more of presenting a graphical user interface, displaying video content, and presenting a game, Internet browser, word processing, calendar, e-mail, or spreadsheet computer program.

10. The peripheral device of claim 3, wherein the one or more processors are included in one or more of the peripheral device, the base device, and a remote server.

11. The peripheral device of claim 3, wherein the one or more processors are configured to determine, independently for each of a plurality of users, a respective usage characteristic profile, each respective usage characteristic profile identifying a respective first criterion for switching between the normal mode and the power saving mode.

12. The peripheral device of claim 3, wherein the one or more processors are configured to create the usage characteristic profile by correlating the temporal spacing of the first set of inputs with one or more of a time of the day, a day of the week, a physical location, or a logical location of the peripheral device.

13. The peripheral device of claim 3, wherein the usage characteristic profile includes the identity.

14. The peripheral device of claim 3, wherein the usage characteristic includes registered identification information, the registered identification information including one or more of an e-mail address, a telephone number, an account number of the user and a serial number of the peripheral device.

15. The peripheral device of claim 3, wherein the peripheral device is a Bluetooth remote control, an electronic mouse or keyboard and the base device is one or more of a set-top box, a television, a game console, an electronic entertainment device, a computer or a personal electronic device.

16. A method comprising:
receiving, with a peripheral device that includes a user interface and a battery, inputs from a user via the user interface;

communicating, responsive to the inputs, with a base device by way of a wireless communication link; and, with a processor:

generating a usage characteristic profile by correlating a temporal spacing of a first set of inputs received at the user interface from at least one user with at least one or both of a first operational mode of the base device or an identity of the at least one user; and adaptively managing power draw from the battery, during at least some intervals between the inputs, responsive to the usage characteristic profile of the user and a status of the base device, by automatically switching between a normal mode and a power saving mode.

17. The method of claim 16, further comprising generating the usage characteristic profile based on the inputs and a second set of inputs from a second peripheral device.

18. The method of claim 16, further comprising causing the peripheral device to switch between a normal mode and a power saving mode when a time interval after a most recent user input meets a criterion identified by the usage characteristic profile.

19. The method of claim 18, wherein the criterion identified by the usage characteristic profile includes one or both of a power down criterion specifying a power down time interval at which the peripheral device is to be switched from a normal mode to a power saving mode and a power up criterion specifying a power up time interval at which the peripheral device is to be switched from a power saving mode to a normal mode.

* * * * *